(12) United States Patent
Garland et al.

(10) Patent No.: US 8,510,650 B2
(45) Date of Patent: Aug. 13, 2013

(54) MULTIPLE SYNCHRONIZED VIEWS FOR CREATING, ANALYZING, EDITING, AND USING MATHEMATICAL FORMULAS

(76) Inventors: Stephen J. Garland, Philadelphia, PA (US); Robert N. Block, Acton, MA (US); George E. Conant, Natick, MA (US)

( * ) Notice: Subject to any disclaimer, the term of this patent is extended or adjusted under 35 U.S.C. 154(b) by 69 days.

(21) Appl. No.: 13/206,728

(22) Filed: Aug. 10, 2011

(65) Prior Publication Data

US 2012/0042242 A1    Feb. 16, 2012

Related U.S. Application Data

(60) Provisional application No. 61/372,510, filed on Aug. 11, 2010.

(51) Int. Cl.
| | |
|---|---|
| *G06F 17/25* | (2006.01) |
| *G06F 17/26* | (2006.01) |
| *G06F 17/27* | (2006.01) |
| *G06F 17/28* | (2006.01) |

(52) U.S. Cl.
USPC ............................ 715/256; 715/267; 715/277

(58) Field of Classification Search
USPC ......................................... 715/256, 277, 267
See application file for complete search history.

(56) References Cited

U.S. PATENT DOCUMENTS

| | | | | |
|---|---|---|---|---|
| 5,025,403 | A | * | 6/1991 | Stephens ........................ 708/137 |
| 5,262,761 | A | | 11/1993 | Scandura et al. |
| 5,469,538 | A | * | 11/1995 | Razdow ......................... 345/440 |
| 5,603,021 | A | | 2/1997 | Spencer et al. |
| 5,748,975 | A | | 5/1998 | Van De Vanter |
| 6,061,513 | A | | 5/2000 | Scandura |
| 6,556,984 | B1 | * | 4/2003 | Zien ........................................ 1/1 |
| 6,851,107 | B1 | | 2/2005 | Coad et al. |
| 7,203,902 | B2 | * | 4/2007 | Balinsky ......................... 715/243 |
| 7,370,315 | B1 | | 5/2008 | Lovell et al. |
| 7,865,826 | B2 | * | 1/2011 | Bernardin et al. ............. 715/273 |
| 7,900,186 | B2 | | 3/2011 | Lucassen et al. |
| 8,037,449 | B2 | * | 10/2011 | Iborra et al. .................... 717/105 |
| 8,078,953 | B2 | * | 12/2011 | Kunz et al. ..................... 715/209 |
| 8,213,719 | B2 | * | 7/2012 | Vukosavljevic et al. ....... 382/186 |
| 8,365,138 | B2 | * | 1/2013 | Iborra et al. .................... 717/104 |
| 2001/0007109 | A1 | * | 7/2001 | Lange ............................ 707/530 |

(Continued)

OTHER PUBLICATIONS

"Maple 10: User Manual". Copyright 2005.*

(Continued)

*Primary Examiner* — Laurie Ries
*Assistant Examiner* — Soumya Dasgupta
(74) *Attorney, Agent, or Firm* — Bourque and Associates, PA

(57) ABSTRACT

A computerized method and system for creating, analyzing, and editing complex formulas so as to facilitate their use in software applications such as spreadsheets and database applications. The method and system employ multiple synchronized views for formulas, one view presenting the linear text required by the software application and the other views presenting clear indications of the meaning of that text. Examples of such views include mathematically typeset formulas and hierarchical diagrams that reveal the formula's structure. The method and system parse formulas to determine their structure, display that structure in multiple views, and provide a variety of controls and aids to assist in analyzing, debugging, and editing the formula so that it has the intended meaning and result. Additionally, it synchronizes the multiple views so that changes to the formula or to the presentation of the formula in one view are automatically reflected in the other views.

18 Claims, 11 Drawing Sheets

(56) References Cited

U.S. PATENT DOCUMENTS

| | | | | |
|---|---|---|---|---|
| 2002/0143830 | A1* | 10/2002 | Bennett | 707/538 |
| 2005/0076929 | A1* | 4/2005 | Fitzgerald et al. | 131/365 |
| 2005/0149846 | A1* | 7/2005 | Shimizu et al. | 715/500 |
| 2006/0031246 | A1* | 2/2006 | Grayson | 707/102 |
| 2008/0077854 | A1* | 3/2008 | Alabi | 715/236 |
| 2008/0115056 | A1* | 5/2008 | Escapa et al. | 715/267 |
| 2009/0307587 | A1* | 12/2009 | Kaneko | 715/700 |

OTHER PUBLICATIONS

Alfred V. Aho, Ravi Sethi, and Jeffrey D. Ullman, *Compilers: Principles, Techniques, and Tools*, Addison-Wesley Publishing Company, Reading, MA, 1986, pp. 1-7.

David Carlisle, Patrick Ion, Robert Miner, Nico Poppelier, and Penta Scope, ed., *Mathematical Markup Language (MathML) Version 2.0*, W3C, 2003. See http://www.w3.org/TR/MathML2.

Eric Carter and Eric Lippert, *Visual Studio Tools for Office*, Addison-Wesley, Boston, MA, 2006, pp. 79-81, 96-101.

*Comparison of TeX Editors*, http://en.wikipedia.org/wiki/Comparison_of_TeX_editors. Jul. 27, 2011.

Erich Gamma, Richard Helm, Ralph Johnson, and John Vlissides, *Design Patterns*, Addison-Wesley Publishing Company, Reading, MA, 1995, p. 4-6.

Stephen J. Garland, *Introduction to Computer Science with Applications in Pascal*, Addison-Wesley Publishing Company, Reading, MA, 1986, pp. 605-613.

Stephen J. Garland, *Instructor's Guide to Accompany Introduction to Computer Science with Applications in Pascal*, Addison-Wesley Publishing Company, Reading, MA, 1987, pp. 273-274.

Reinhold Heckmann and Reinhard Wilhelm, A functional description of TEX3 s. formula layout, *Journal of Functional Programming* 7:5, 1997, Cambridge University Press, New York.

Donald E. Knuth, The TeXbook, Addison—Wesley Publishing Company, Reading, MA, 1984, Chapters 16-17.

Matthew MacDonald, *Pro WPF in C# 2010*, Apress, New York, NY, 2010, pp. xxix, 23-27.

Miika Nurminen, *Java-COM integration with Jacob using XML wrappers*, Reports of the Department of Mathematical Information Technology, No. C. Feb. 2006, University of Jyväskylä, Finland, 2006. See http://users.jyu.fi/~minurmin/javacom/javacom_report.pdf.

Thomas W. Reps and Tim Teitelbaum, *The Synthesizer Generator: A System for Constructing Language-Based Editors*, Springer Verlag, 1989, pp. 1-6.

W3C, MathML Software—Components and SDKs, http://www.w3.org/Math/Software/mathml_software_cat_components.html. Jun. 7, 2011.

* cited by examiner

Figure 1

$$f(x) = \frac{1}{\sqrt{2\pi}} e^{-x^2/2}$$

Figure 4

| | A | B | C | B | E | F |
|---|---|---|---|---|---|---|
| 1 | Variables | | | Kind of Formula | Test Formula | Value of Formula |
| 2 | 2 | 5 | 2 | Quadratic | (-B2+SQRT(B2^2-4*A2*C2))/(2*A2) | -0.5 |
| 3 | 3 | | | Normal distribution | 1/SQRT(2*PI())*EXP(-A3^2/2) | 35.91163964 |
| 4 | | | | | | |
| 5 | | | | | 401 | |
| 6 | | | | | | |
| 7 | | | | | | |
| 8 | | | | | | |

400

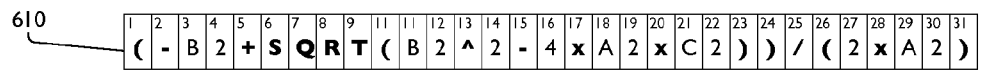
Figure 6b
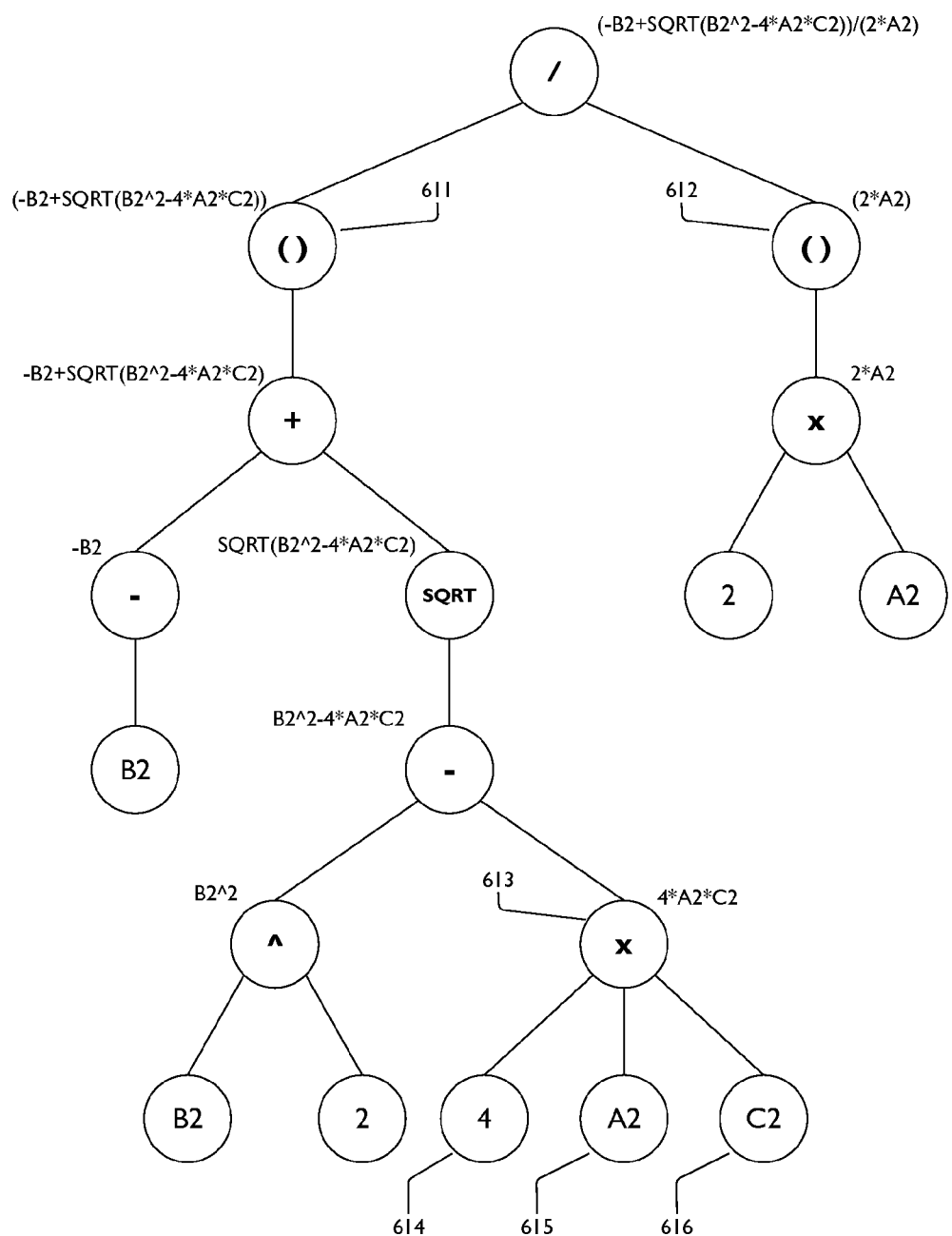

MULTIPLE SYNCHRONIZED VIEWS FOR CREATING, ANALYZING, EDITING, AND USING MATHEMATICAL FORMULAS

CROSS REFERENCE TO RELATED APPLICATIONS

This application claims the benefits of U.S. Provisional Patent Application Ser. No. 61/372,510, filed on Aug. 11, 2010 titled "Multiple Synchronized Views for Creating, Analyzing, Editing, and Using Mathematical Formulas", which is incorporated herein by reference.

FIELD OF THE INVENTION

The present invention pertains generally to systems and methods for creating, displaying, editing, and analyzing mathematical formulas that are used in computer-implemented software applications, and more particularly to a system and method for synchronizing multiple presentations so as to help users understand and debug such formulas.

BACKGROUND OF THE INVENTION

Software applications such as spreadsheet and database programs use mathematical formulas to compute values from stored data. Normally, they require users to create and view such formulas as text, that is, as one-dimensional mathematical expressions. As these expressions grow longer and more complicated, it becomes increasingly difficult for users to read them and to understand their algebraic or logical structure.

Consider, for example, the following spreadsheet formula, which is intended to represent the definition of the normal probability distribution function shown in FIG. 1.

$$=1/SQRT(2*PI(\ ))*EXP(-A3^2/2)$$

When used with certain spreadsheet programs, such as Microsoft® Excel® ("Excel"), this formula causes a subtle error, which is difficult for users to perceive from its display as text, but which the present invention clearly exposes (see the discussion below of elements 541 and 552 in FIG. 5).

Consider, for another example, the spreadsheet formula $$=IF(OR(`Sheet2`'!E1=\text{``Final''},`Sheet2`'!E1=\text{``Draft''},$$
$$`Sheet2`'!E1=\text{``None''}),IF(`Sheet2`'!E1=\text{``Final''},IF$$
$$(OR(`Sheet2`'!M1>`Sheet`'!F1,AND$$
$$(`Sheet2`'!M1=`Sheet2`'!F1,`Sheet2`'!N1>=`Sh$$
$$eet2`'!G1True,False),`Sheet2`'!E1),\text{`` ''})$$

This formula contains nested logical functions that test values in referenced cells in a spreadsheet, and its value depends on the values in the referenced cells and on a decision tree represented by the nested logical functions. But the structure of that decision tree is difficult for users to perceive from its display as text.

The process of debugging such formulas to ensure they produce the intended results is time consuming and fraught with errors. It is easy to overlook or miscount parentheses, which control the order of evaluation for a formula. Some programs color code matching parentheses to help identify the constituent phrases in a formula, but this coding is difficult to see and comprehend. Users may add spaces and line breaks to help clarify the structure implicit in a textual display, but such formatting provides no convenient means for navigation among a formula's constituent phrases. This invention not only presents an organized view of the formula but also provides navigation controls, interim values, and other aids that help users understand and debug their formulas.

DESCRIPTION OF THE PRIOR ART

Many software applications, including spreadsheets, databases, and compilers for programming languages, recognize formulas as having a natural hierarchical structure in which expressions are composed of smaller, simpler expressions, called subexpressions. These applications employ syntactic analysis, also known as parsing, to compute this hierarchical structure from the textual representation for a formula (see Aho et. al. 1986, pp. 6-7).

As discussed in standard textbooks (e.g., Aho et. al. 1986, p. 2), tree diagrams provide a means for illustrating such hierarchical structures. FIG. 2 (which appears in Garland 1986, p. 605), shows a tree diagram for the formula x−y/2+5. Each subexpression of this formula corresponds to a node in the tree. The topmost node, which corresponds to the entire formula, is known as the root of the tree. Primitive expressions, which cannot be divided into simpler expressions, correspond to leaves of the tree. Expressions that can be divided into simpler expressions correspond to nodes with one or more children, which correspond to direct subexpressions. Each node in the tree, other than the root, is the child of a unique parent. Ancestors of a node are the parent of the node, that parent's parent, etc., up to and including the root node. Descendants of node are all nodes for which the given node is an ancestor. Two nodes are siblings if they have the same parent. One sibling node is said to be before another if its corresponding expression comes before (i.e., lexically to the left of) the expression corresponding to its sibling; otherwise it is said to be after its sibling.

Scandura and Stone, *Displaying hierarchical tree-like designs in windows*, disclose how to display and modify tree-like data structures. Reps and Teitelbaum 1989 describe how to construct hybrid editors, which allow users to edit both the textual and structural representations of a formula. Van De Vanter, *System and method for textual editing of structurally-represented computer programs with on-the-fly typographical display*, extends the approach of Reps and Teitelbaum to handle incomplete and ill-formed input. Scandura, *Automated methods for constructing language specific systems for reverse engineering source code into abstract syntax trees with attributes in a form that can more easily be displayed, understood and/or modified*, likewise discloses methods for displaying and editing both the textual and structural representations of a formula. Spencer et. al., *Methods for composing formulas in an electronic spreadsheet system*, discloses how to use a tree diagram, which it calls a Formula Outline Pane, to examine the structure of a formula and to edit its parts. It also discloses the use of a separate text-based Subexpression Field to edit parts of a formula, and it discloses synchronizing the contents of the Formula Outline Pane and the Subexpression Field to reflect edits performed in one or the other of them. Both Coad et al., *Software development tool with instant updating and simultaneous view of graphical and a textual display of source code*, and Lovell et al., *Visual programming environment providing synchronization between source code and graphical component objects*, disclose synchronizing a source code editor and a graphical design surface to reflect changes made in one or the other. Lucassen and Maes, *MVC (Model-View-Controller) based multi-modal authoring tool and development environment*, discloses using the Model-View-Controller design pattern (see Gamma et al., page 5) to synchronize a collection of multi-modal, multi-channel views of information as this information is being edited in one of the channels.

However, none of these authors and inventors discloses synchronizing changes to the presentation of a formula across multiple views. Such changes include highlighting, expanding and collapsing, and abbreviating parts of the formula. In terms of the Model-View-Controller design pattern, none of these authors discloses techniques that would include aspects of a formula's presentation, rather than just the formula itself, in the model.

Microsoft Equation Editor in Excel 2010 enables users to create mathematically typeset formulas and to use them as annotations in a spreadsheet. But it does not provide any connection between such typeset formulas and the text in its formula bar. Hence users who choose to use this feature must input formulas twice, once as text suitable for use in the formula bar and once using the Equation Editor. Furthermore, Excel provides no means for ensuring the consistency of these two expressions.

Microsoft Visual Studio provides two views of graphical user interfaces defined in WPF, the Windows Presentation Foundation (see MacDonald, p. xxix): a graphical design view and a text-based XAML (Extensible Application Markup Language) view (see MacDonald, pp. 23-27). It synchronizes both views with respect to changes to an interface made in one view, and it synchronizes one change to the presentation in those views; namely, it indicates a user interface element selected in one view by highlighting that element in both views. But it does not synchronize other aspects of the presentation such as highlighting all occurrences of an identifier or expanding and collapsing parts of the XAML description.

Accordingly, what is needed is a computerized method and system for creating, analyzing, and editing complex formulas so as to facilitate their use in software applications such as spreadsheet and database applications. Such a method and system should provide multiple synchronized views for formulas, one view presenting the linear text required by the software application and the other views presenting clear indications of the meaning of that text. The method and system should parse formulas to determine their structure, display that structure in multiple views, and provide a variety of controls and aids to assist in analyzing, debugging, and editing the formula so that it has the intended meaning and result. Additionally, such a method and system should synchronize the multiple views so that changes to the formula or to the presentation of the formula in one view are automatically reflected in the other views

SUMMARY OF THE INVENTION

The rules of algebra and logic, together with the definitions of functions provided by a software application, define how that application processes formulas to calculate values. By organizing and displaying a formula's mathematical phrases in one or more two-dimensional representations, which complement the application's one-dimensional textual representation, this invention makes it much easier to understand how that application interprets that formula. Examples of such representations include mathematically typeset formulas and hierarchical diagrams that reveal its structure.

This invention obtains a formula from a software application, parses it to determine its structure, displays that structure and ancillary information in multiple views, and provides a variety of controls and aids to assist in analyzing, debugging, and editing the formula so that it has the intended meaning. Most importantly, it synchronizes the multiple views so that changes to the formula or to its presentation in one view are automatically reflected in the other views. Typical changes to a formula's presentation include highlighting selected elements (e.g., as the user navigates among those elements or to indicate multiple occurrences of a selected phrase), expanding and collapsing elements (to reveal and suppress detail), and otherwise abbreviating elements (again, to suppress detail as an aid to understanding).

BRIEF DESCRIPTION OF THE DRAWINGS

FIG. 1 shows the definition of a formula (for the normal probability distribution) as it appears in mathematics textbooks and as known in the prior art.

FIG. 4 shows a sample spreadsheet that displays, according to prior art, the text and values of two mathematical formulas.

FIG. 6b shows the internal representation used by this preferred embodiment for the formula that represents the solution of the quadratic equation.

DETAILED DESCRIPTION OF A PREFERRED EMBODIMENT

Figure 2:
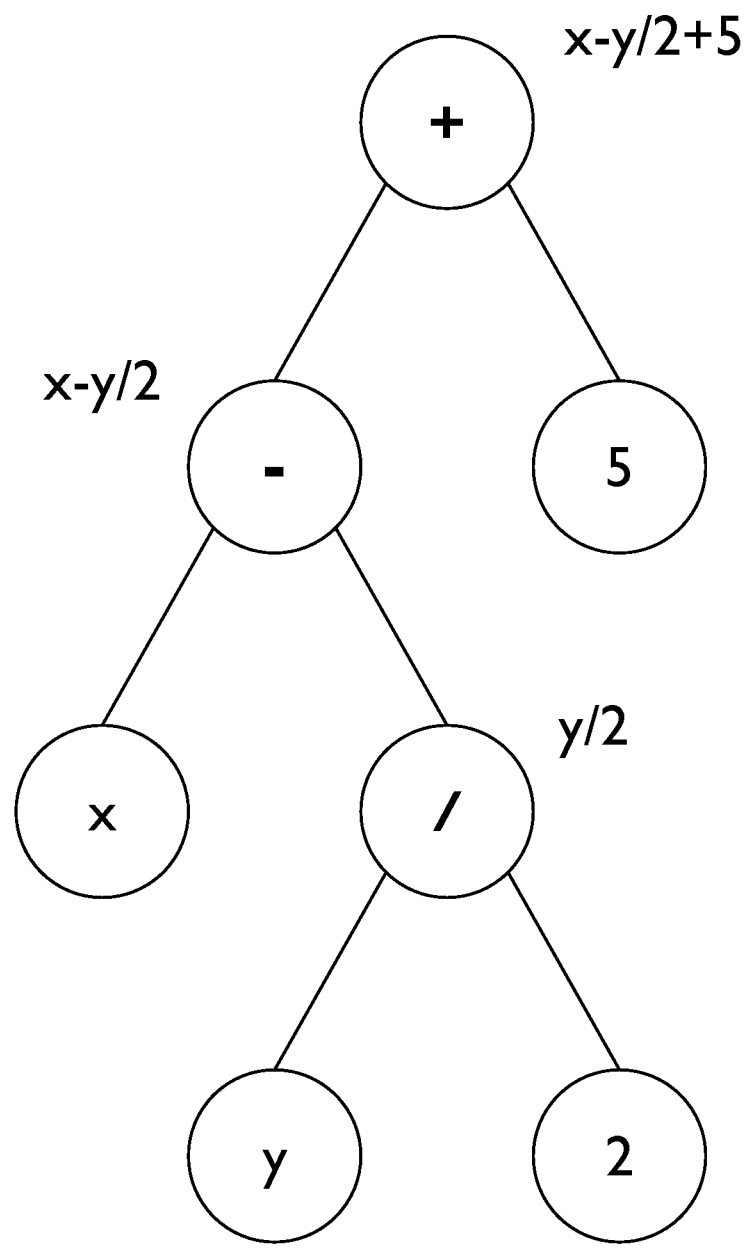
FIG. 2 shows a tree diagram for a simple formula displayed according to the prior art.
Figure 3:
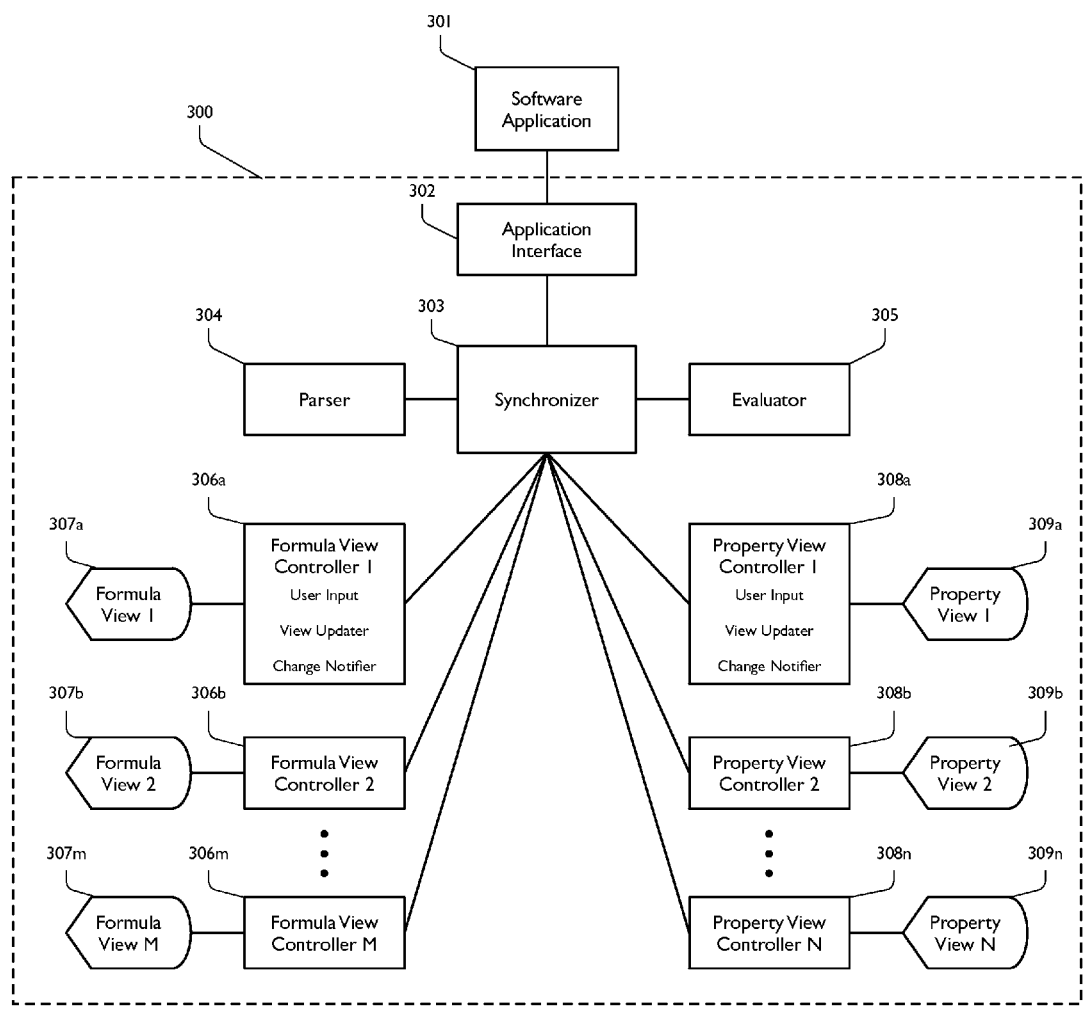
FIG. 3 shows the components of a preferred embodiment for this invention.

FIG. 3 depicts the software architecture 300 of a preferred embodiment of this invention. Software application 301 is an existing program, such as a spreadsheet or database application, that uses formulas. Synchronizer 303 communicates with software application 301 through application interface 302 to obtain a formula, to evaluate this formula and its constituent phrases, to obtain other information about the constituent parts of the formula, and to communicate changes in the formula back to software application 301.

Synchronizer 303 employs parser 304 to determine the structure of a formula and evaluator 305 to aid in the evaluation of a formula and its constituent phrases (e.g., by caching the values of these phrases so as to reduce the need for recomputing these values and/or for communication through application interface 302). Synchronizer 303 uses the information obtained in this fashion to create formula views 307a through 307m, which provide the user with alternative means for visualizing the formula and its structure. In the preferred embodiment, these views include a text view, a math view, and a tree view, described in more detail below.

The preferred embodiment uses parser 304 to create an internal representation for a formula and passes this representation to Formula View Controllers 306a through 306m, which respectively create and manage Formula Views 307a through 307m. Synchronizer 303 may also create additional views 309a through 309n for various properties of the formula. In the preferred embodiment, such additional views include one that shows information about a selected phrase in the formula, a list of the spreadsheet cells and ranges referenced by the formula, and a list of phrases that may or may not occur in the formula.

In the preferred embodiment, software application 301 is Microsoft Excel, and application interface 302 communicates with it using the Excel Object Model (see Carter and Lippert, pp. 96-101). All components of the preferred embodiment other than software application 301 are written in the C# programming language, use the Windows Presentation Foundation (WPF) for constructing the user interface, and are packaged as a COM add-in for Excel (see Carter and Lippert, pp. 79-81).

Alternative embodiments of this invention may work with different software applications, provide different numbers and kinds of formula views, provide different numbers and kinds of property views, and differ inconsequentially in look-and-feel. Software application 301 might be, for example, a SQL query tool for a database application, a software application for graphing functions, or a statistical package.

Other techniques, familiar to those versed in the state of the art, may be used to implement alternative embodiments. For example, an embodiment may be integrated directly into a software application, in which case application interface 302 may consist of method calls to other components of application 301 and parser 304 may be the actual parser used by this application. Alternatively, an embodiment may consist of a separate software application implemented in another programming language such as Java, C++, or Python, and application interface 302 may communicate with software application 301, or with a macro extension of software application 301, through sockets, the TCP/IP network protocol, or middleware such as the JACOB Java-Com Bridge (see Nurminen 2006).

FIG. 4 shows a sample spreadsheet 400 as it appears in Excel. The spreadsheet consists of a rectangular array of cells, with the rows of the array indexed by the numbers 1, 2, 3, . . . and the columns indexed by sequences of letters A, B, . . . , Z, AA, AB, . . . . Cells may contain values (e.g., numbers or strings of characters) or formulas, which may reference values in other cells. Users may select cells in the spreadsheet (e.g., by clicking them) in order to edit their contents. The dark border around cell 401 in FIG. 4 indicates that the user has selected this cell.

Figure 5:
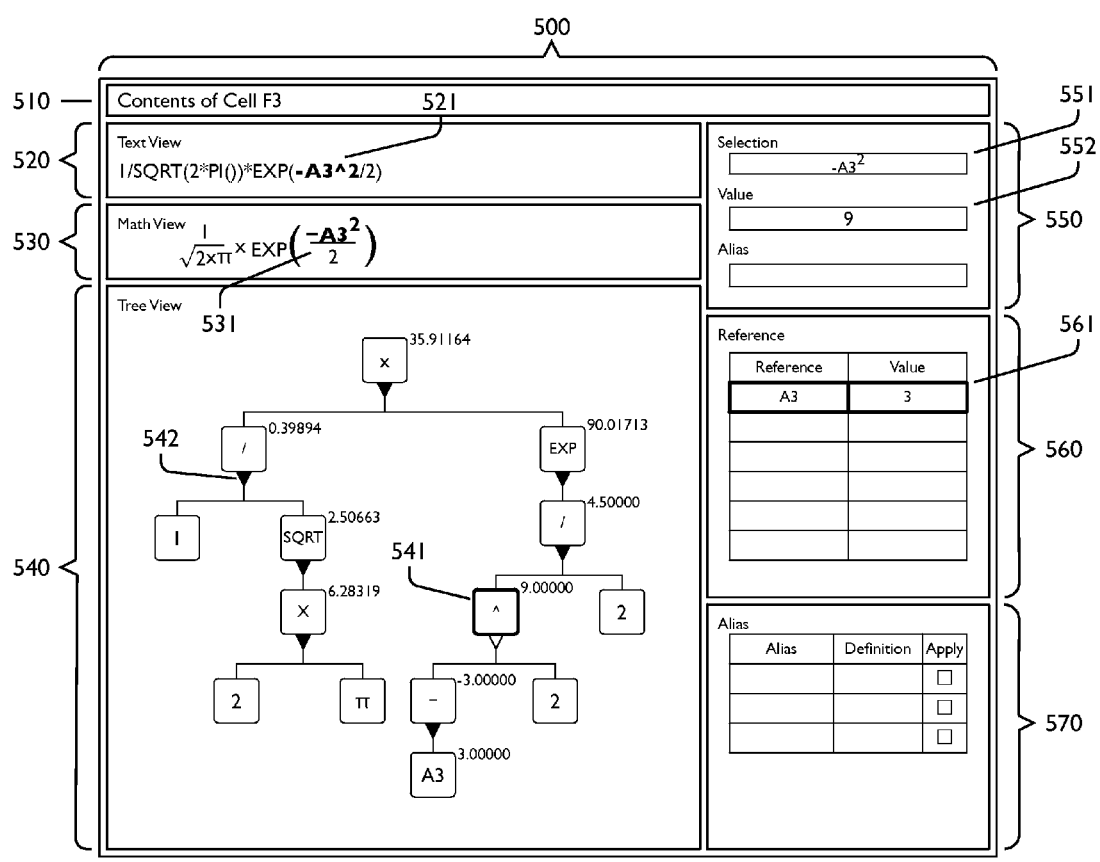
FIG. 5 shows the key elements in the user interface of a preferred embodiment of the present invention, as well as the synchronization of the selection and highlighting of a constituent phrase in a formula across multiple views of the formula

FIG. 5 shows the key elements in the graphical user interface 500 presented by view synchronizer 303 in the preferred embodiment. Title bar 510 indicates that the formula being edited was extracted from spreadsheet cell 401.

Graphical user interface 500 contains three Formula View 307 panes (labeled 520, 530 and 540) and three Property View 309 panes (labeled 550, 560 and 570).

Figure 1:
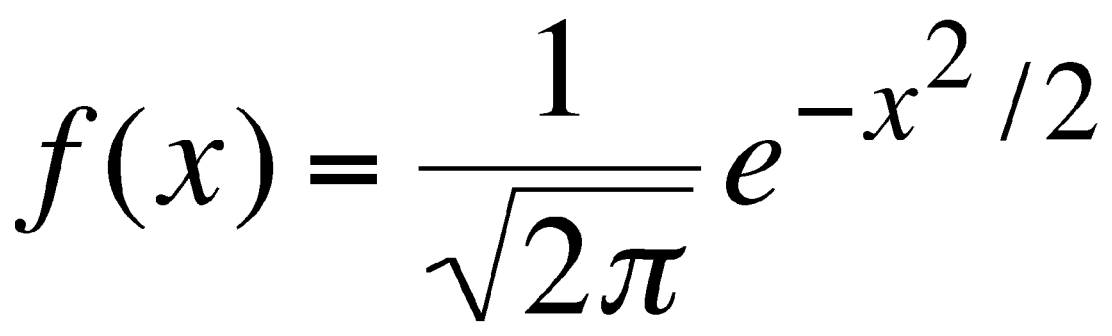
Figure 9:
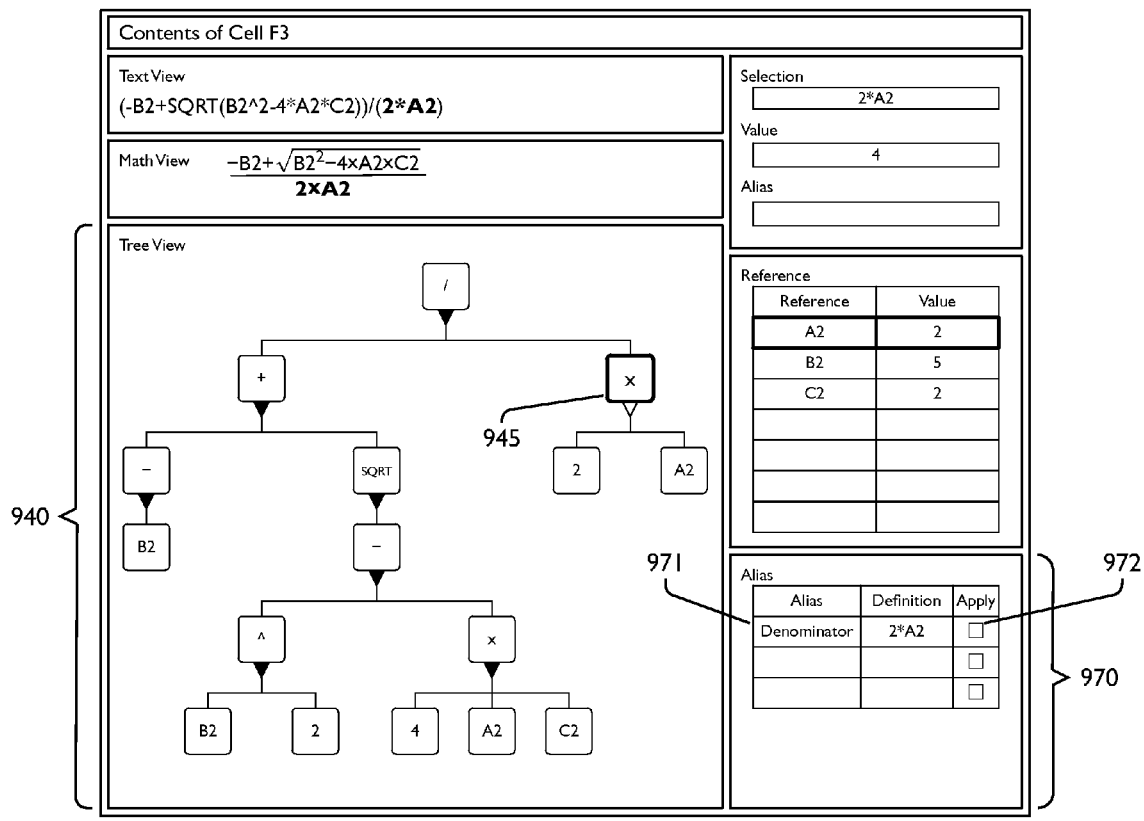
FIG. 9 shows the user interface of a preferred embodiment for specifying an alias text string that will replace a specified expression in all views.
Figure 10:
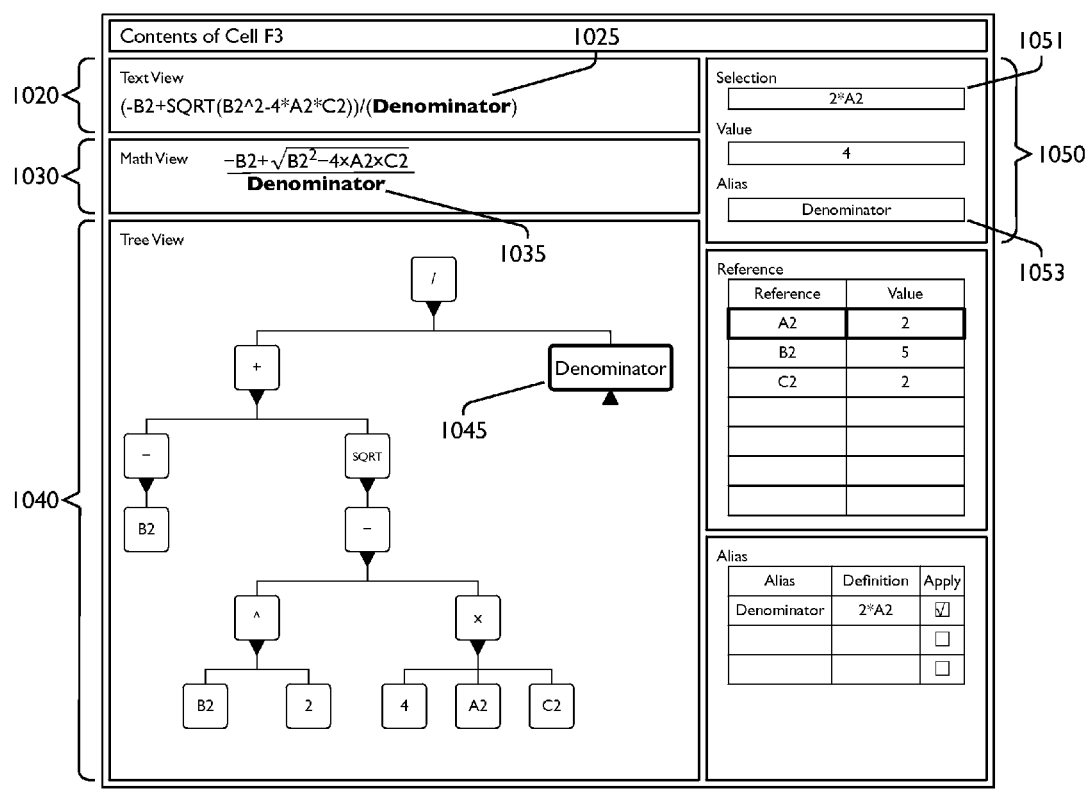
FIG. 10 shows the substitution of the alias text from FIG. 9 in all views.

Text View Pane 520 is an instance of Formula View 307 and shows the formula obtained from spreadsheet cell 401. Math View Pane 530 is a second instance of Formula View 307 and shows a typeset version of the formula similar to that in FIG. 1. Tree View Pane 540 is a third instance of Formula View 307 and shows the hierarchical structure of the formula as well as the values computed by software application 301 for each of the formula's constituent compound phrases; as FIGS. 9 and 10 illustrate, users may choose to suppress the display of these values. Node 541 in Tree View Pane 540 is highlighted to indicate its selection by the user (e.g., by a click on that node).

Selection Pane 550 is an instance of Property View 309; it displays information about the node 541 selected by the user in Tree View Pane 540. Reference Pane 560 is another instance of Property View 309 and shows that the formula in spreadsheet cell 401 contains a single reference to spreadsheet cell A3. Alias Pane 570 is a third instance of Property View 309 and contains an initially empty list of expressions and aliases that can be used to abbreviate a formula in panes 520, 530, and 540. The controllers for the multi-column displays in panes 560 and 570 enable users to hide and re-order various columns in those displays, as well as to re-order the rows in these panes.

Figure 6A:
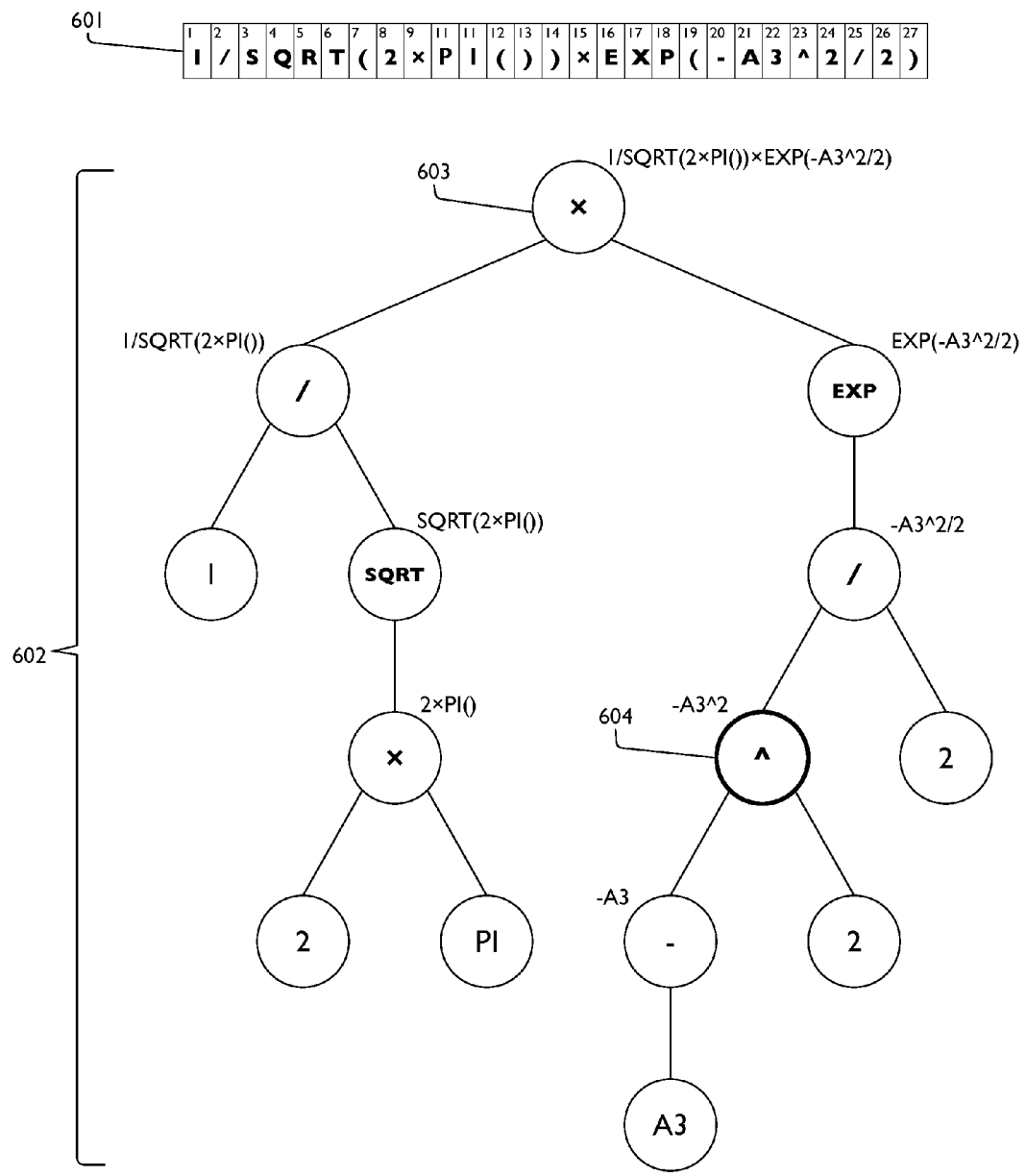
FIG. 6a shows the internal representation used by a preferred embodiment for the normal distribution formula in FIG. 4 and FIG. 5.

FIG. 6a shows an internal representation for the formula in spreadsheet cell 401, as created by Synchronizer 303 in the preferred embodiment using parser 304. This internal representation consists of buffer 601 containing the text of the formula and tree 602 containing nodes that correspond to the constituent phrases in the formula.

Parser 304 uses lexical analysis to extract a sequence of symbols, known to those versed in the art as tokens or lexemes, from the text in buffer 601. It then analyzes this sequence using a context-free grammar for Excel formulas, based on the documented precedence for operators in Excel, to produce tree 602. Each node in this tree is labeled by one or more symbols extracted from buffer 601. Leaf nodes are labeled by constants (e.g., 2), by references (e.g., A3), or by functions with no arguments (e.g., PI). Nonleaf nodes are labeled by operators (e.g., /, ^) or by functions with arguments (e.g., EXP). The children of nonleaf nodes correspond respectively to an operator's operands or to a function's arguments. As shown in FIG. 6b, left-associative expressions such as 4*A2*C2 produce nodes such as 613 in which additive and multiplicative binary operators have three or more nodes (614, 615, and 616) as children. Attached to each nonleaf node (e.g., node 603) in tree 602 is the text of its constituent phrase, as it appears in buffer 601. The entire formula is located at root 603 of tree 602. Alternative embodiments may employ variations on this internal representation; for example, they may omit nodes 611 and 612 in FIG. 6b, because it is possible to generate the parentheses in buffer 610 that specify associativity from the structure of the tree.

In the preferred embodiment, the instance of Formula View Controller 306 for Text View Pane 520 obtains the displayed text from the text attached to root 603 of the internal representation. In an alternative embodiment, Formula View Controller 306 for Text View Pane 520 might generate this text from tree 602 by an algorithm known in the art as an unparser or a tree traversal (see Garland 1986, pp. 606-608, and Garland 1987, pp. 273-274).

In the preferred embodiment, the instance of Formula View Controller 306 for Math View Pane 530 uses methods well known in the art to produce a graphical rendition (similar to the one in FIG. 1) for a typeset mathematical formula (see Knuth 1984 or Heckmann and Wilhelm 1997). By using standard mathematical notation, the math view provides users with a more familiar view for a formula.

In an alternative embodiment, Formula View Controller 306 for Math View Pane 530 might traverse tree 602 to generate a representation of the formula in buffer 601 in the mathematical markup language MathML (see Carlisle et. al. 2003), and it might use the open-source JEuclid MathViewer or proprietary software such as the Formulator ActiveX Control to display this representation (see W3C, MathML Software). Another alternative embodiment might use the Microsoft Equation Editor to generate the display. Yet another alternative embodiment might use TeX (see Knuth 1984) as a mathematical markup language and one of many software packages (see Comparison of Tex Editors) as a rendering engine.

In the preferred embodiment, the instance of Formula View Controller 306 for Tree View Pane 540 displays tree 602 as a collapsible organization chart. In an alternative embodiment, Formula View Controller 306 might display a tree using the WPF TreeView control, which displays trees in a form similar to that used by email readers or file system explorers to display the contents of nested mailboxes or directories.

By showing the structure of a formula, the tree view shown in FIGS. 6A and 6B clarifies how software application 301 interprets that formula. Thus, for example, the tree view identifies a subtle error in the formulation of the normal probability distribution function in FIG. 4: node 541 in Tree View Pane 540, which corresponds to node 604 in FIG. 6a, shows that Excel interprets the expression $-A3\hat{\ }A2$ as $(-A3)\hat{\ }2$, not as $-(A3\hat{\ }2)$. This explains why value 552 in Selection Pane 550 is 9 and not −9, as the user might expect.

Alternative embodiments may provide additional synchronized views. For example, they may provide formula views that display a formula in Reverse Polish notation or in MathML, and they may provide property views that display representations for the logical structure of a formula that contains functions such as IF, AND, and OR using decision tables or trees.

Instances of Formula View Controller 306 enable users to manipulate Text, Math, and Tree View Panes 520, 530, and 540 by selecting or highlighting parts of the formula, navigating among its constituent phrases, eliding its display, abbreviating its constituent phrases, and editing its definition.

FIG. 5 shows how such manipulations in one of these panes are synchronized across the other panes. When the user selects node 541 in Tree View Pane 540 by clicking it, or, as described later, when the user clicks collapse icon 542, Formula View Controller 306 for the tree view annotates internal representation 602 to indicate that node 604 corresponds to the currently selected node 541 in Tree View Pane 540 and to indicate the expand/collapse status of the tree. This controller then uses its Change Notifier to inform Synchronizer 303 of the change in this internal representation. Synchronizer 303 in turn synchronizes the views in all other panes with the new tree view by informing the View Updaters in Formula View Controllers 306, as well as in Property View Controllers 308, of the change in internal representation 602. Formula View Controller 306 for the text view highlights, using boldface text 521, the portion of the Text View Pane that corresponds to currently selected node 541. Likewise, Formula View Controller 306 for the math view highlights, in boldface, portion 531 of the Math View Pane that corresponds to this node. Property View Controller for Selection Pane 550 updates the contents of that pane to reflect the selection of node 541. Finally, Property View Controller 308 for Reference Pane 560 highlights row 561, which contains the single reference in this node.

Navigation mechanisms (using combinations of the arrow and ALT keys) in Tree View Pane 540 enable users to change the currently selected node to its parent, to its first child, or to its left or right sibling. Synchronizer 303 mirrors, as just described, such changes across the remaining views.

View Controllers 306 and 308 may also provide mechanisms for selecting and/or highlighting portions of a formula for uses other than navigation (e.g., for cutting and pasting text, for locating occurrences of a particular reference, or for calling attention to potential problems in a formula). For example, controller 306 for Text View Pane 520 enables cursor movements and text selection familiar to users of standard word processors such as Microsoft Word®. Likewise, controller 306 for Math View Pane 530 enables similar cursor movements and text selection. Synchronizer 303 mirrors changes in cursor position or text position in one of panes 520 and 530 in the other of these panes. For another example, Property View Controller 308 for Reference Pane 560 invokes Synchronizer 303 to highlight all occurrences of the references in the currently selected rows in this pane in all formula views.

Figure 7:
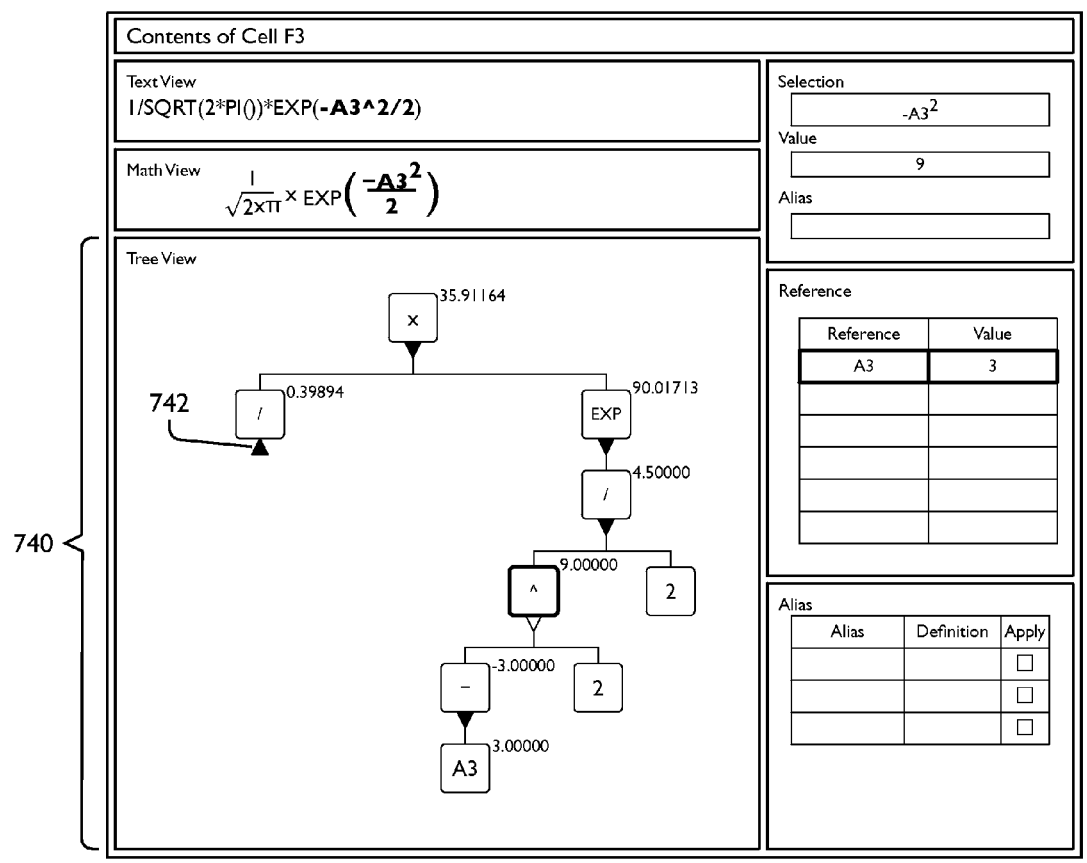
FIG. 7 shows the result of a preferred embodiment having collapsed a constituent phrase in one view.

The preferred embodiment provides several ways of eliding the display of a formula. Users can elide portions of the display of Tree View Pane 540 by clicking one or more collapse icons. FIG. 7 shows the result of the user clicking collapse icon 542 in this Tree View Pane. Formula View Controller 306 for the tree view uses its View Updater to change collapse icon 542 into expand icon 742 and to elide the nodes beneath it. Users can expand collapsed nodes in the tree view by clicking on icons such as expand icon 742, which changes back into collapse icon 542 as the controller redisplays the elided nodes.

Figure 8:
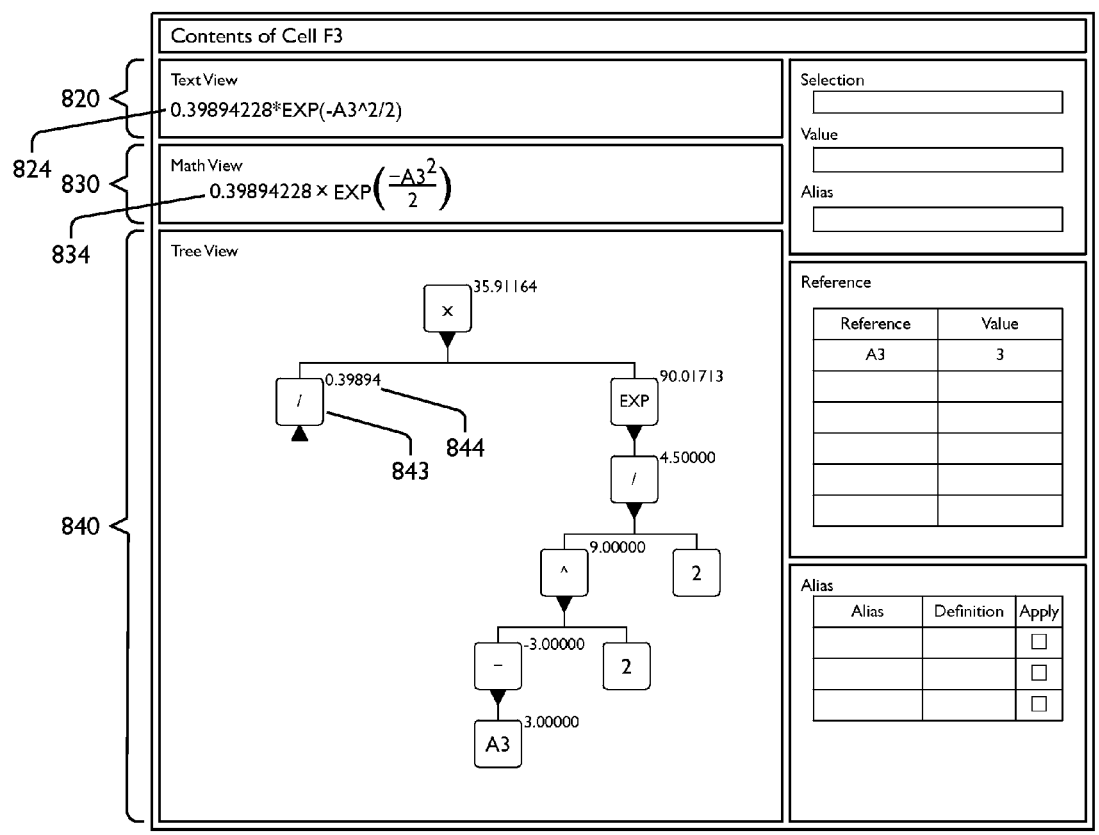
FIG. 8 shows the synchronized replacement by a preferred embodiment of a collapsed phrase by its value in multiple views of the formula.

In addition, users can mirror such elisions in Text View Pane 520 and Math View Pane 530 by selecting an option from a menu (not shown). As FIG. 8 shows, one option causes collapsed node 843 in Tree View Pane 840 to be replaced by its value 844 in element 824 of Text View Pane 820 and element 834 of Math View Pane 830. Another option replaces collapsed nodes by ellipses ( . . . ) rather than by their values and enables users to expand these nodes by clicking the ellipses.

The preferred embodiment also enables users to simplify a formula's display by using Alias Pane 570 (FIG. 5) to abbreviate one or more of its constituent phrases. FIG. 9 shows the appearance of the user interface after the user has dragged node 945 in Tree View Pane 940 to Alias Pane 970, clicked box 971 in the row that appears in this pane, and entered the text "Denominator" in box 971. If the user checks checkbox 972 in the "Apply" column of that row, Synchronizer 303 ensures that this text replaces all occurrences of the expression 2*A2 in all formula views (as shown in FIG. 10) by element 1025 of Text View Pane 1020, element 1035 of Math View Pane 1030, and element 1045 of Tree View Pane 1040); it also provides an indication 1053 in Selection Pane 1050 that the alias has been applied to the currently selected node 1045.

Alternative embodiments may provide means for indicating, in one or more views, ways in which a formula may be simplified (e.g., by removing superfluous parentheses or by performing algebraic simplifications such as replacing 0+x or 1*x by x), and they may provide various means for automating such simplifications. In these alternative embodiments, Synchronizer 303 propagates simplifications made in one Formula View 307 to all other views.

In the preferred embodiment, Synchronizer 303 also propagates explicit changes to a formula's definition to all views. The preferred embodiment enables users to change a formula's definition in various ways, for example, by manipulating its structure in Tree View Pane 540 or by editing the text corresponding to the currently selected node in a separate Edit Window, which is created when the user selects an option from a menu (not shown).

Users can edit the contents of this Edit Window in a manner similar to that allowed by Microsoft Word, and they can click a "Check" button in this window to have parser 304 and evaluator 305 detect and report any errors found in the edited formula. When they are satisfied with the changes they have made, they can click a "Finish" button in the Edit Window to have Synchronizer 303 propagate the changes in the formula to all Formula Views 307, to update Selection Pane 550 to reflect any changes in the currently selected node, and to update Reference Pane 560 to reflect any changes in the references contained in the edited formula.

Users can also manipulate a formula's definition directly in Tree View Pane 540 using structural editing capabilities that are well known in the art (see Reps and Teitelbaum 1989). The preferred embodiment disallows structural modifications that would cause parser 304 to detect an error, and it uses evaluator 305 to detect and report other potential errors noticed by software application 301 (e.g., division by 0 or a reference to a nonexistent worksheet).

Alternative embodiments may provide additional means for editing a formula either textually or structurally. For example, the math view may enable users to edit a formula in a manner similar to that allowed by the Microsoft Equation Editor. Once editing in one view is complete, the remaining views are synchronized with the view in which the editing was initially performed.

Synchronizer 303 also, upon user command, communicates any changes made to a formula's definition back to software application 301.

The present invention is not intended to be limited to a system or method that must satisfy one or more of any particular stated or implied objects or features of the invention and should not be limited to the preferred, exemplary, or primary embodiment(s) described herein. Modifications and substitutions by one of ordinary skill in the art are considered to be within the scope of the present invention, which is not to be limited except by the allowed claims and their legal equivalents.

What is claimed is:

1. A computerized method for constructing, analyzing, displaying, and editing a mathematical formula entered by a user for use in a software application, said computerized method comprising the acts of: responsive to receiving a mathematical formula entered into said software application by said user, said computerized method providing, to a display device viewable by said user, an application-preferred view of said mathematical formula, said application-preferred view suitable for use in said software application utilizing said mathematical formula;

responsive to receiving a mathematical formula entered into said software application by said user, said computerized method providing, to said display device viewable by said user, one or more additional views of said mathematical formula, said one or more additional views different from said application-preferred view, wherein at least one of said one or more additional views of said mathematical formula displays a hierarchical diagram graphically clarifying the structure of said mathematical formula; and responsive to providing said one or more additional views of said mathematical formula, providing one or more computerized means configured for synchronizing the display of said application-preferred and said one or more additional views of said mathematical formula.

2. The method of claim 1, in which at least one of said application-preferred and said one or more additional views of said mathematical formula displays a character-based representation of said mathematical formula.

3. The method of claim 1, in which at least one of said application-preferred and said one or more additional views of said mathematical formula displays a typographical representation of said mathematical formula in standard mathematical notation.

4. The method of claim 1, wherein said hierarchical diagram graphically clarifies the structure of said mathematical formula in terms of its constituent phrases.

5. The method of claim 4, wherein said hierarchical diagram includes a display of one or more nodes corresponding to said constituent phrases of said mathematical formula, and wherein values corresponding to said nodes in said hierarchical diagram are displayed as part of or proximate to said nodes.

6. The method of claim 4, wherein said hierarchical diagram includes a display of one or more nodes corresponding to said constituent phrases of said mathematical formula, and wherein said nodes in said hierarchical diagram can be collapsed and expanded.

7. The method of claim 6, in which constituent phrases corresponding to collapsed nodes in said hierarchical diagram are replaced by their values in at least one other of said application-preferred and said one or more additional views of said mathematical formula.

8. The method of claim 6, in which constituent phrases corresponding to collapsed nodes in said hierarchical diagram are replaced by ellipses in at least one other of said application-preferred and said one or more additional views of said mathematical formula.

9. The method of claim 1, in which at least one of said one or more computerized means configured for synchronizing the display, to said display device, of said application-preferred and said one or more additional views of said mathematical formula is operative to synchronize navigation within one of said views with navigation in another of said views.

10. The method of claim 1, in which at least one of said one or more computerized means configured for synchronizing the display, to said display device, of said application-preferred and said one or more additional views of said mathematical formula is operative to cause a display device to reflect the selection or highlighting of one or more portions of said mathematical formula in one of said views by causing said display device to select or highlight the same or related portions of said mathematical formula in at least one other of said views.

11. The method of claim 10, in which at least one of said one or more computerized means configured for synchronizing the display, to said display device, of said application-preferred and said one or more additional views of said mathematical formula is operative to cause said display device to highlight problems in said mathematical formula in two or more of said views.

12. The method of claim 10, wherein said one or more additional views of said mathematical formula displays a list of references contained in said mathematical formula, and wherein highlighting a reference in said list highlights all occurrences of said reference in said at least one other of said application-preferred and said one or more additional views.

13. The method of claim 1, in which at least one of said one or more computerized means configured for synchronizing the display, to said display device, of said application-preferred and said one or more additional views of said mathematical formula is operative to reflect the suppression of detail performed in one of said views in another of said views.

14. The method of claim 1, in which at least one of said one or more computerized means configured for synchronizing the display, to said display device, of said application-preferred and said one or more additional views of said mathematical formula is operative to reflect changes made while editing one of said views in another of said views.

15. The method of claim 1, wherein said one or more additional views of said mathematical formula displays a list of references contained in said mathematical formula.

16. The method of claim 1, wherein said one or more additional views of said mathematical formula displays a list of constituent phrases in said mathematical formula along with potential abbreviations or aliases for said constituent phrases.

17. The method of claim 16, wherein an act of entering an alias in said list of constituent phrases replaces all occurrences of said constituent phrase by said alias in said at least one other of said application-preferred and said one or more additional views.

18. A system for constructing, analyzing, displaying, and editing a mathematical formula entered by a user for use in a software application, said system comprising:
- a processor, responsive to processor instructions which, when executed by said processor, are configured for constructing, analyzing, editing, parsing, and synchronizing a mathematical formula, and for causing display of two or more views of a mathematical formula to a display device;

said processor instructions including a mathematical formula receiver, for receiving, from said user, a mathematical formula entered into said software application for use by said software application;

said display device, viewable by said user, coupled to said mathematical formula receiver and to said software application, and responsive to said received mathematical formula entered into said software application by said user, for displaying an application-preferred view of said mathematical formula, and one or more additional views of said user mathematical formula, wherein at least one of said one or more additional views of said mathematical formula displays a hierarchical diagram graphically clarifying the structure of said mathematical formula;

said processor instructions further including:
- a mathematical formula parser, responsive to said received mathematical formula entered into said software application by said user, for determining the structure of said entered mathematical formula; and
- a view synchronizer, responsive to said mathematical formula parser and responsive to user interactions with a user input device that affect the display of at least one of said application-preferred and one or more additional views of said formula, for synchronizing the display, on said display device, of at least one other of said application-preferred and one or more additional views of said mathematical formula.

* * * * *